United States Patent [19]

Day et al.

[11] Patent Number: 4,879,985
[45] Date of Patent: Nov. 14, 1989

[54] TIMING AND SPEED SENSOR FOR FUEL INJECTION PUMP

[75] Inventors: Eric Day, Longmeadow; Jean Paul Aubin, South Hadley, both of Mass.; Jan Peyrot, Glastonbury, Conn.

[73] Assignee: AIL Corporation, Columbia, S.C.

[21] Appl. No.: 175,685

[22] Filed: Mar. 22, 1988

Related U.S. Application Data

[63] Continuation of Ser. No. 106,973, Sep. 29, 1987, abandoned, which is a continuation of Ser. No. 796,058, Nov. 7, 1985, abandoned.

[51] Int. Cl.$^4$ .................... F02M 59/20; F02M 65/00
[52] U.S. Cl. .................................. 123/501; 73/119 A
[58] Field of Search .................. 123/501, 502, 357; 73/119.3, 119 A

[56] References Cited

U.S. PATENT DOCUMENTS 4,417,469 11/1983 Stevenson et al. ............ 73/117.3 X
4,417,554 11/1983 Dinger ............................. 123/502 X Primary Examiner—Tony M. Argenbright
Attorney, Agent, or Firm—Richard D. Weber; Albert L. Free

[57] ABSTRACT

First and a second rotating members are driven in syntony with each other but at variable advance angles with respect to each other. A sensor (32) provides a position signal indicative of a predetermined rotational position of the first rotating member. A toothed wheel (40) is fixed to the second rotating member and a sensor (44) adjacent to the wheel provides a pulse indicative of each occurrence of tooth (42)/sensor (44) juxtaposition. The speed of the rotating members is determined by the pulse frequency or the time interval between the pulses. The advance angle is determined by measuring the time interval between the position signal and a particular pulse, such as the one immediately after the position signal, and multiplying the result by the determined speed.

3 Claims, 1 Drawing Sheet

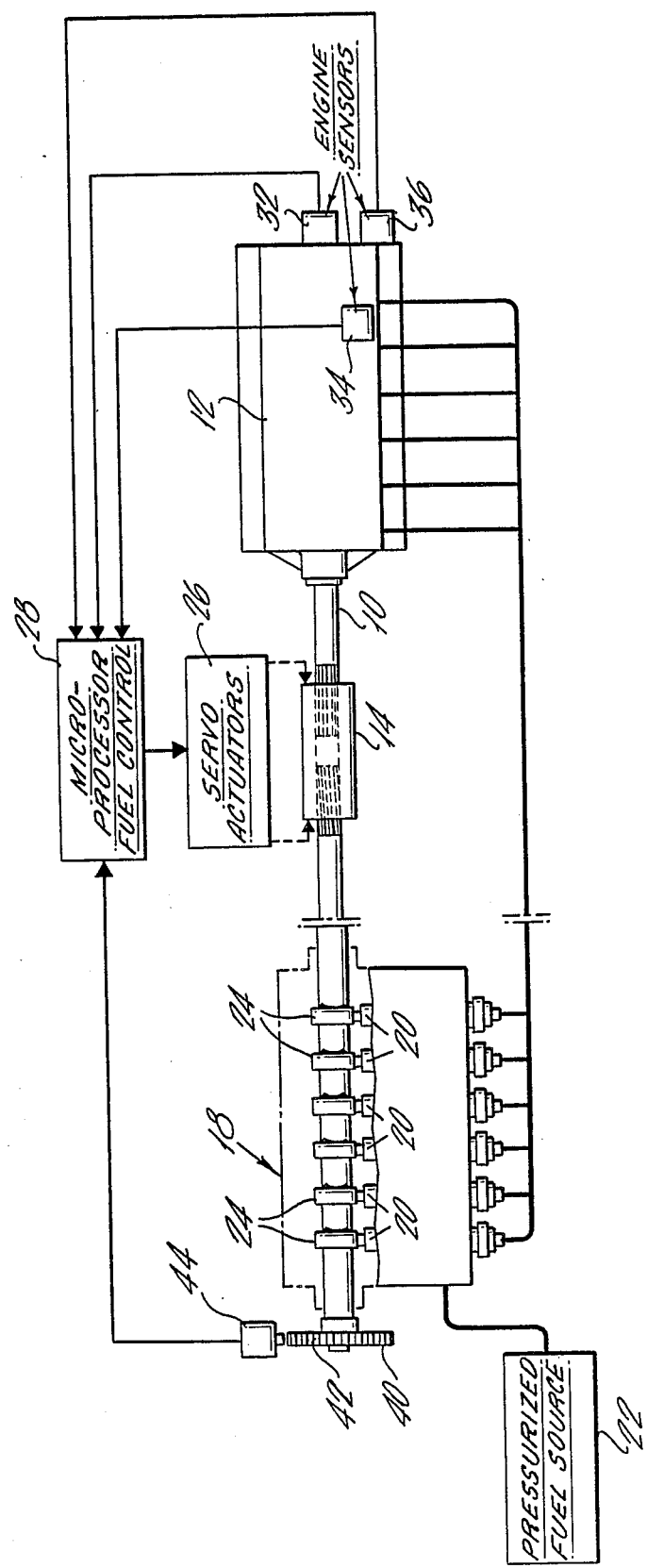

TIMING AND SPEED SENSOR FOR FUEL INJECTION PUMP

This is a continuation of co-pending application Ser. No. 106,973 filed on Sept. 29, 1987, which is a continuation of co-pending application Ser. No. 796,058 filed Nov. 7, 1985, both now abandoned.

TECHNICAL FIELD OF THE INVENTION

The invention relates to sensing the speed and relative angle between two rotating members.

BACKGROUND OF THE INVENTION

A typical arrangement for detecting the rotational speed of a rotating member such as the camshaft of a fuel injection pump involves a toothed wheel coaxially fixed to the rotating member and a suitable sensor disposed in proximity to the toothed wheel for providing a pulse upon each occurrence of tooth/sensor juxtaposition. These pulses may be converted to logic states in a digital electronic fuel control or may be converted to analog voltage levels in an analog electronic fuel control.

A typical arrangement for detecting the timing of a rotating member involves coaxially fixing a wheel having a single tooth or detent to the rotating member and a suitable sensor disposed in proximity to the wheel for providing a pulse per revolution upon the occurrence of tooth (or detent)/sensor juxtaposition.

DISCLOSURE OF THE INVENTION

It is an object of this invention to provide both fuel pump speed and fuel injection timing information by using a single sensor. This provides a lower component count and commensurate cost savings.

First and second rotating members are driven in syntony with each other but at variable advance angles with respect to each other. A sensor provides a position signal indicative of a predetermined rotational position of the first rotating member. A toothed wheel is fixed to the second rotating member and a sensor adjacent to the wheel provides a pulse indicative of each occurrence of tooth/sensor juxtaposition.

The speed of the rotating members is determined by the pulse frequency or the time interval between the pulses. The advance angle is determined by measuring the time interval between the position signal and a particular pulse, such as the one immediately after the position signal, and multiplying the result by the determined speed.

Other objects, advantages and features of the invention will become apparent in light of the following description.

BRIEF DESCRIPTION OF THE DRAWINGS

FIG. 1 is a schematic of the invention.

BEST MODE FOR CARRYING OUT THE INVENTION

FIG. 1 shows the basic components of this invention. A pump drive shaft 10 is driven by an engine 12. The pump drive shaft 10 is coupled via a helically-splined sleeve 14 to the camshaft 16 of a fuel pump 18. Individual plungers 20 in the fuel pump 18 supply a metered fuel charge from a pressurized fuel source 22 to individual cylinders of the engine 12 in response to the urgings of individual lobes 24 on the camshaft 16.

The sleeve 14 is axially positionable by servo actuators 26 to vary the relative angular position (timing) of the camshaft 16 with respect to the pump drive shaft 10, within a limited range of relative angular positions, while driving the camshaft in syntony (at the same speed) with the pump drive shaft. The servo actuators 26 are responsive to a control signal from a microprocessor-based fuel control 28.

A sensor 32 provides a position signal indicative of a unique reference crankshaft position relative to engine TDC to the fuel control 28. A sensor 34, such as a start of combustion (SOC) sensor, provides a SOC signal to the fuel control 28 indicative of the onset of the combustion event or other phenomena indicative of the timing of the injection of the metered fuel charge in a reference cylinder. Sensors 36 provide additional signals indicative of engine operating parameters such as load (fuel consumption), ambient temperature, engine temperature, and throttle lever setting, each of which is provided to the fuel control 28.

A wheel 40 having a plurality of identical teeth 42 evenly spaced about its circumference is attached to the camshaft 16 opposite the splined sleeve 14. The number of teeth 42 may preferably be an integral multiple of the number of cylinders in the engine. A sensor 44 is positioned adjacent the circumference of the wheel 40 so that the teeth 42 are serially presented to the sensor. Each occurrence of tooth/sensor juxtaposition causes a pulse to be provided by the sensor 44 to the fuel control 28. It is well known to provide a suitable tooth profile and a suitable sensor such as a hall-effect device such that the rise time for a pulse is very fast for accurate determination of tooth/sensor juxtaposition and to measure the frequency of the pulses on the time interval between successive pulses to determine the rotational speed of the wheel. Since the rotational speed of the camshaft is generally always equal to the rotational speed of the pump drive shaft, and hence the engine, varying only slightly from equality during changes in the axial position of the splined sleeve, the sensor 44 provides engine speed information to the fuel control 28.

If the wheel 40 is fixed in a predetermined rotational manner with respect to the camshaft, such as machined onto the camshaft, the camshaft advance angle can readily be determined with reference to the crankshaft based on the speed of rotation and the time interval between the crankshaft reference position signal and a particular sensor 44 pulse, such as the pulse immediately after the crankshaft reference position signal. Thus, an actual cam timing signal can be obtained from the sensor 44, as well as the cam speed signal.

It is apparent that the speed/position sensor 44 of this invention is applicable to any rotating member having a variable positional relationship to another rotating member whose position is known. For instance, the sensor 44 may be used in a fuel injector pump of the type having a nonrotating annular cam member with lobes on its inside diameter and a rotating plunger assembly, if the timing of the plunger assembly were to be retarded or advanced. (Usually, however, timing in such a fuel injection pump is varied by positioning the nonrotating annular member.)

We claim:
1. Apparatus comprising:
   a first rotating member;
   a second rotating member;

coupling means for driving said second rotating member in syntony with and at variable rotational angles with respect to said first rotating member;

first sensor means for producing reference pulses indicative of the times of occurrence of only one specific reference rotational position of said first rotating member;

wheel means synchronously driven by said second rotating member and having a plurality of tooth members evenly spaced about it;

second sensor means disposed adjacent said wheel means for producing a pulse for each occurrence of a juxtaposition one of said tooth members with said second sensor means;

means responsive to said pulse from said second sensor means for providing a speed signal indicative of the rotational speed of said second rotating member, in response to the frequency or time interval between said pulses;

means for producing a time-difference signal indicative of the timer interval between each pulse from said first sensor means and a next adjacent pulse from said second sensor means; and means responsive to said speed signal and to said time-difference signal for producing a signal which is a function of the product of said rotational speed times said time interval, and indicative of the angle between said first and second rotating members.

2. Apparatus according to claim 1, wherein:

the first rotating member (10) is a pump drive shaft of an engine (12);

the second rotating member (16) is a camshaft in a fuel injection pump for the engine.

3. Apparatus according to claim 2, wherein:

the coupling means (14) is a helically-splined, axially positionable coupling connecting the pump drive shaft to the camshaft.

* * * * *